United States Patent

Meneely et al.

[11] Patent Number: 5,684,846
[45] Date of Patent: Nov. 4, 1997

[54] NUCLEAR REACTOR PLANT HAVING CONTAINMENT ISOLATION

[75] Inventors: Timothy K. Meneely, Penn Hills; Levi Ike Ezekoye, Pittsburgh; Thomas J. Laubham, Irwin, all of Pa.

[73] Assignee: Westinghouse Electric Corporation, Pittsburgh, Pa.

[21] Appl. No.: 531,684

[22] Filed: Sep. 21, 1995

[51] Int. Cl.$^6$ ........................................ G21C 9/00
[52] U.S. Cl. ..................... 376/293; 376/283; 376/298; 376/247
[58] Field of Search ........................ 376/293, 283, 376/298, 247; 148/402

[56] References Cited

U.S. PATENT DOCUMENTS

| | | | |
|---|---|---|---|
| 1,047,769 | 12/1912 | East et al. | 122/451.1 |
| 3,594,675 | 7/1971 | Wilson | 337/140 |
| 3,613,732 | 10/1971 | Wilson | 137/625.44 |
| 3,859,166 | 1/1975 | Flynn et al. | 376/282 |
| 3,972,504 | 8/1976 | DiSabatino, Jr. et al. | 251/82 |
| 4,007,561 | 2/1977 | Okano et al. | 51/241 |
| 4,523,605 | 6/1985 | Ohkata | 137/62 |
| 4,531,988 | 7/1985 | Todoroki et al. | 148/402 |
| 4,570,851 | 2/1986 | Cirillo | 236/93 |
| 4,705,212 | 11/1987 | Miller et al. | 236/54 |
| 4,753,771 | 6/1988 | Conway et al. | 376/282 |
| 4,836,443 | 6/1989 | Wolters et al. | 236/92 |
| 5,141,153 | 8/1992 | Jeffress | 236/93 |
| 5,261,597 | 11/1993 | Periman et al. | 236/93 |

OTHER PUBLICATIONS

Raychem Corporation; *Thermal Actuation with Shape Memory Alloys*, by Dieter Stoeckel; pp. 1–11.

*Primary Examiner*—Charles T. Jordan
*Assistant Examiner*—Meena Chelliah

[57] ABSTRACT

A nuclear reactor plant has a nuclear reactor vessel in a containment vessel. Air ducts, sump discharge lines, service water lines and other non-process non-critical lines extending through the wall of the containment vessel can be isolated passively (i.e., without instrumentation and control systems or power) should a postulated event which raises the atmospheric temperature within the containment vessel occur. The passive containment isolation system includes an isolation valve disposed in the non-process line and an actuator responsive to the atmospheric temperature within the containment vessel. The actuator is operatively connected with the isolation valve for closing the non-process line in response to the atmospheric temperature. The actuator is preferably disposed in or adjacent a containment sump at the bottom of the reactor vessel or adjacent the reactor vessel cavity where the temperature of the local atmosphere will most rapidly rise.

9 Claims, 3 Drawing Sheets

1

NUCLEAR REACTOR PLANT HAVING CONTAINMENT ISOLATION

BACKGROUND OF THE INVENTION

The invention relates to a nuclear reactor plant having a containment isolation system for isolating a containment vessel from the surrounding environment.

In a commercial pressurized water reactor or a boiling nuclear reactor plant, a nuclear steam supply system is enclosed by a large containment vessel which would prevent the release of radioactivity from the supply system to the surrounding environment in the event a postulated loss of cooling accident such as a pipe break in the reactor coolant system should occur. A containment isolation system is designed to prevent non-essential flows from the containment vessel such as air changes and the like which might transmit released radioactivity out of the containment vessel after the event has occurred. Typically, an isolation system employs various in-containment temperature, pressure and other sensors for inputting signals to a plant computer monitoring the operation of the plant. Should such a postulated event occur, the computer would implement preprogrammed procedures to close isolation valves in air ducts and other non-essential lines.

While prior isolation systems effectively isolate the containment vessels, these systems generally depend upon continued availability and reliability of the plant computer, the instrument and control systems, power system and their backup subsystems if the containment isolation system is to be deemed operable and reliable. In addition, these systems and subsystems and their components require continuous maintenance, inspection and testing to assure their reliability and availability.

SUMMARY OF THE INVENTION

It is an object of the present invention to provide a highly reliable nuclear power plant having a containment isolation system which functions independently of the plant computer, instrument and control systems and plant power. It is a further object to provide a reliable isolation system which requires less maintenance, inspection and testing than do presently employed systems.

With these objects in view, the present invention resides in a nuclear reactor plant, comprising a containment vessel having an atmosphere at a nominal temperature for enclosing a nuclear steam supply system, a fluid pipe extending through the containment vessel for transferring non-essential fluids into and out of the containment vessel and a passive containment isolation system. The containment isolation system has an isolation valve disposed in the fluid pipe and an actuator responsive to the atmospheric temperature within the containment vessel and operatively connected with the isolation valve for passively closing the fluid pipe in response to the atmospheric temperature. Preferably, the passive actuator has a shape memory effect actuating element which elastically deforms at a transition temperature or other passive actuating element which deforms because of a temperature change to close a valve in the non-essential pipe independently of power, instrumentation and control systems or any intervention by the human operators of the plant.

BRIEF DESCRIPTION OF THE DRAWINGS

The invention as set forth in the claims will become more apparent from the following detailed description of various preferred embodiments thereof shown, by way of example only, in the accompanying drawings, wherein:

2

Figure 1:
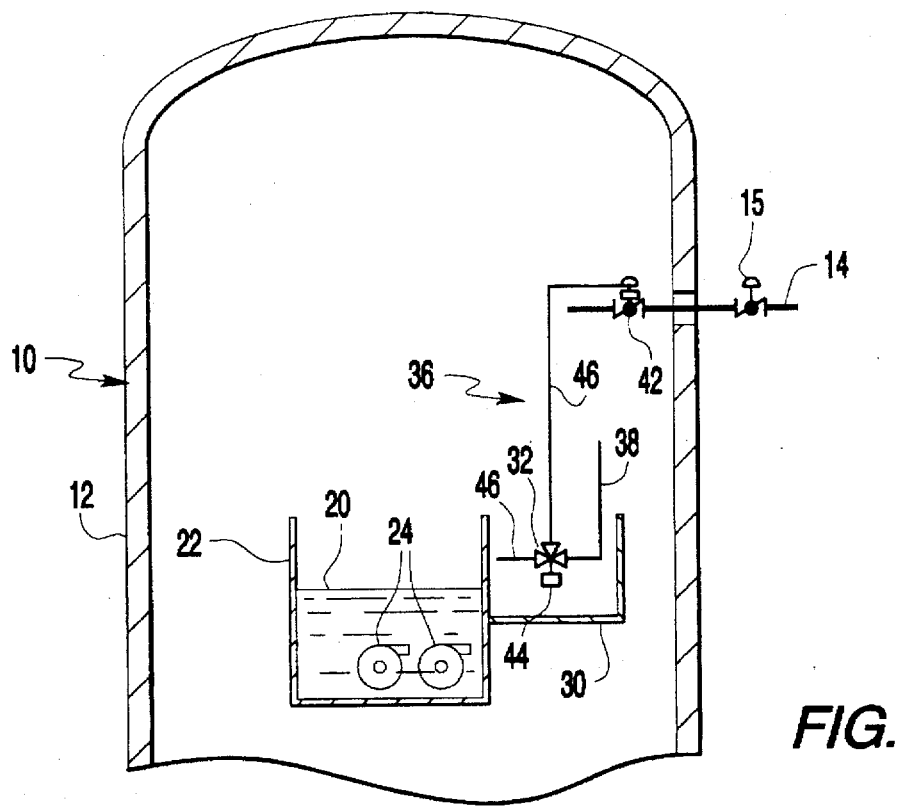
Figure 2:
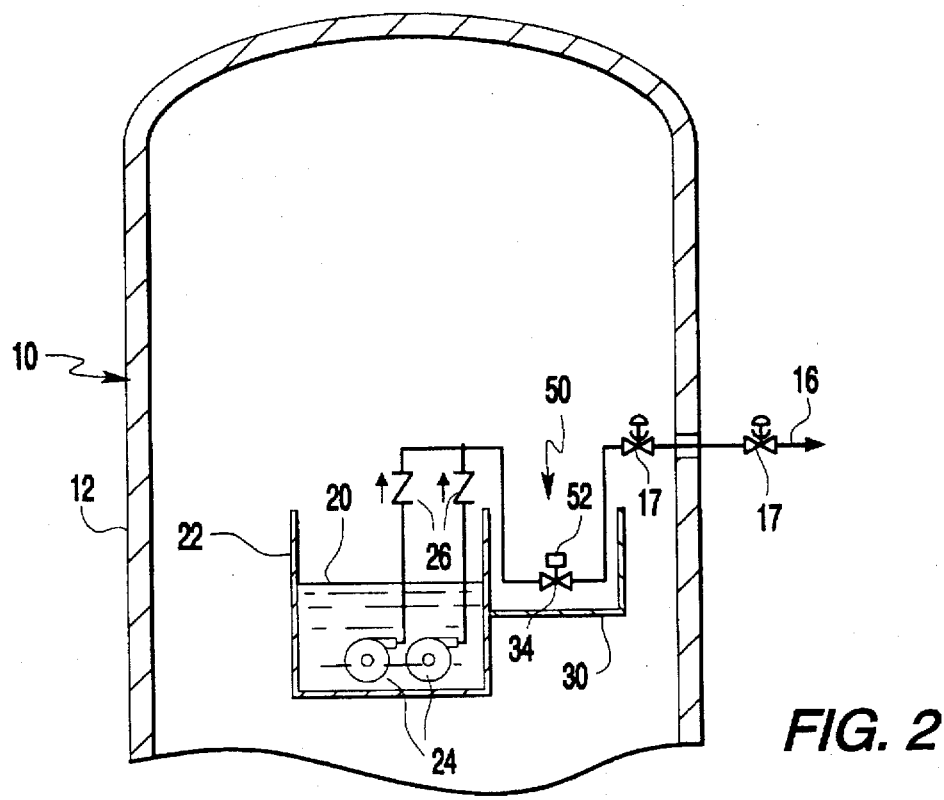
Figure 3:
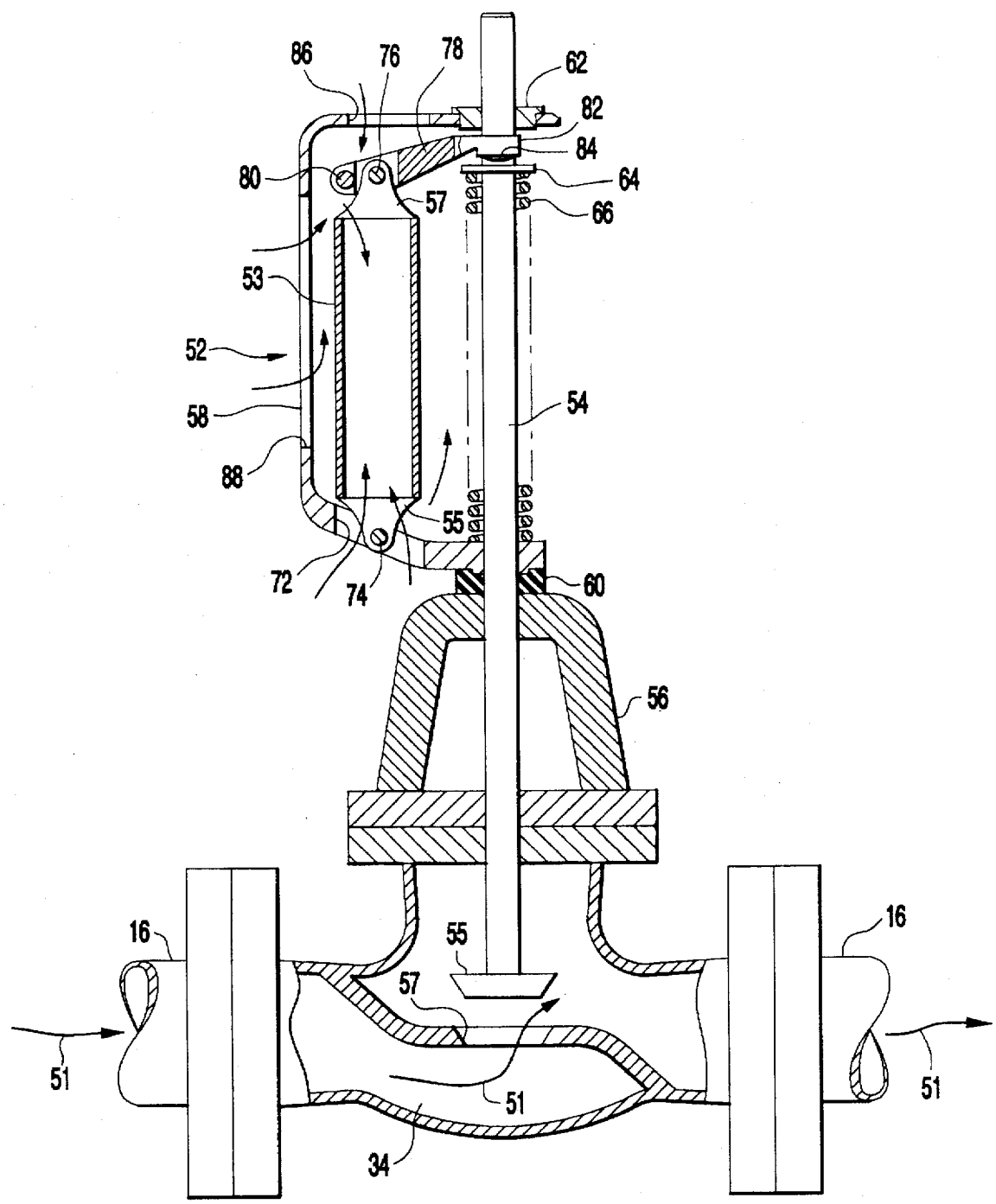
Figure 4:
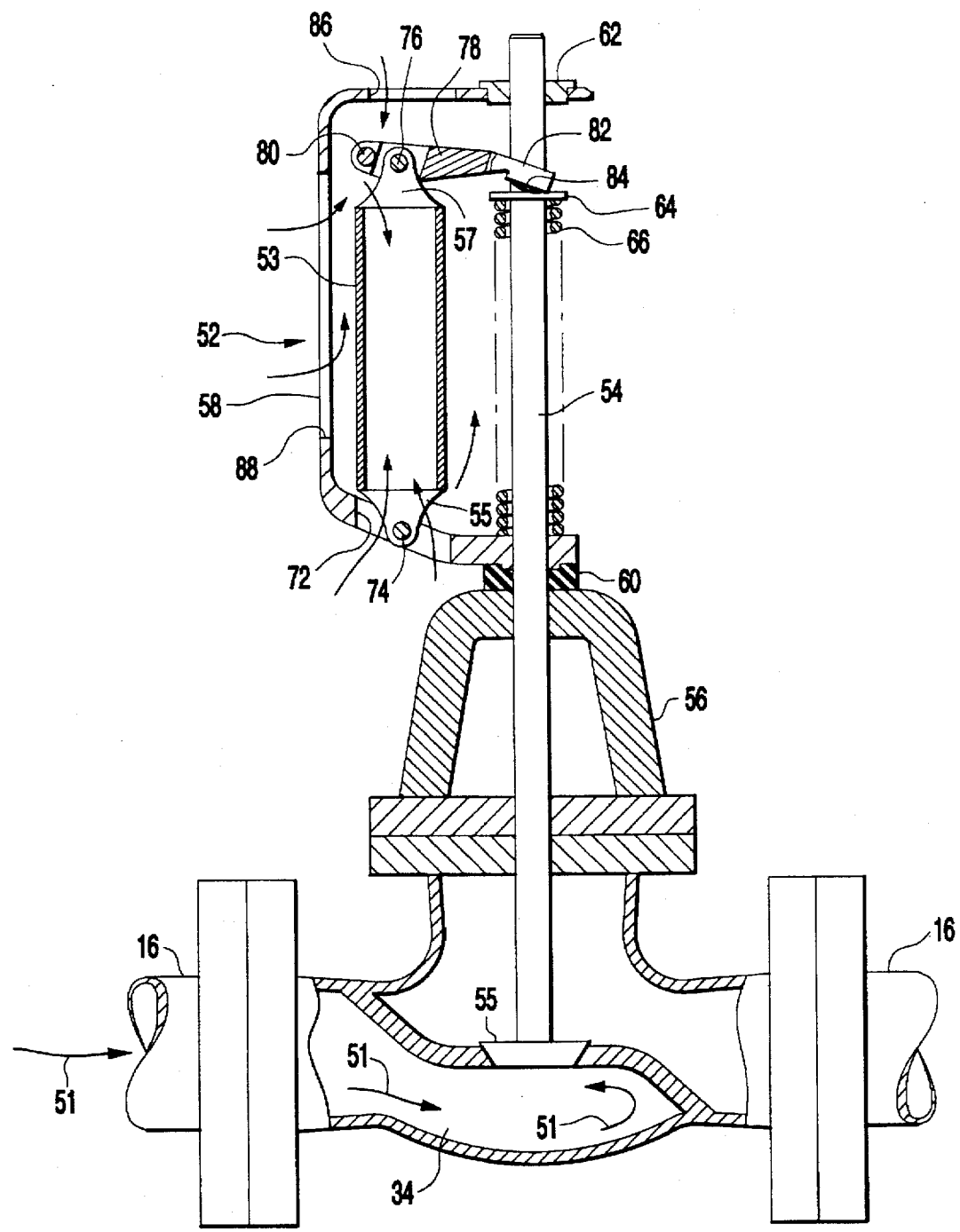

FIG. 1 is a schematic representation of a nuclear reactor plant employing a first embodiment of the present invention;

FIG. 2 is a schematic representation of a nuclear reactor plant employing a second embodiment of the present invention;

FIG. 3 is a elevational partially sectioned view of an isolation valve and actuator shown in FIG. 2;

FIG. 4 is an elevational partially sectioned view of the isolation valve and actuator of FIG. 3 shown in the closed position.

DESCRIPTION OF THE PREFERRED EMBODIMENTS

Referring now to the drawings in detail and in particular to FIGS. 1 and 2 there is shown a commercial nuclear reactor plant 10 having a containment vessel 12 for enclosing a nuclear system for supplying steam to one or more turbines which generate electrical power (not shown). A pressurized water reactor plant generally includes a reactor vessel, from one to four steam generators, interconnecting piping between the reactor vessel and the steam generators and interconnecting piping extending between the steam generators and the turbines. A boiling water reactor plant generally includes a steam generating reactor vessel and interconnecting piping extending between the reactor vessel and the turbines.

Various pipes extend through the wall of the containment vessel 12 which permit routine non-process flows such as atmospheric air, sump water, service water and the like to flow into and/or out of the containment vessel 12 during power operations and periodic outages. For example, air duct 14 shown in FIG. 1 represents a large diameter line having an on-line control valve 15 for changing the air in the containment vessel 12. Sump discharge pipe 16 shown in FIG. 2 represents a small diameter line having an on-line control valve 17 for periodically pumping aqueous wastes 20 from an in-containment sump 22 located at a low point in the containment vessel 12. The sump 22 typically has two sump pumps 24, one of which acts as a spare, to transfer the sump wastes 20 to waste treatment facilities (not shown) located outside the containment vessel 12. Check valves 26 prevent backflow of sump water through the spare pump 24.

As is shown in FIGS. 1 and 2, a nuclear plant may have a valve box or compartment 30 located near, and preferably adjacent, the sump 22, which would experience a substantial and rapid increase in temperature as high temperature steam and condensate 20 would flood the sump 22 in the event of a loss of cooling accident. The atmosphere in the valve box 30 would normally be the nominal temperature of the general atmosphere of the general sump area within the containment vessel 12. The valve box 30 may be covered (not shown) to protect a valve 32 (shown in FIG. 1) or a valve 34 (shown in FIG. 2) from impacts. Alternatively, the valves 32 and 34 may be entirely exposed to the general atmosphere of the containment vessel 12 if a valve box is not desired. Also, the valves 32 and 34 may be located in a reactor cavity (not shown) or other location in the containment vessel 12 which would rapidly experience a substantial and rapid increase in temperature in the event of a loss of cooling accident.

FIG. 1 illustrates a passive containment isolation system 36, i.e., an isolation system which will function without human intervention, utility power or instrument and control signals, for closing the air duct 14 in the event of a postulated event such as a coolant pipe break which would release large amounts of high temperature steam and water to the general atmosphere of the containment vessel 12. The passive containment isolation system includes the valve 32 in the valve box 30. This valve 32 is a small pilot valve in an instrument air line 38 which normally provides air through air line 40 to control a large shutoff valve 42 in a normally open position. The valve 42 may be up to 12 inches or larger. A thermally sensitive actuator such as a diaphragm 44 passively will vent the air from instrument air line 38 to vent line 46 in the event that high temperature steam and condensate collect in the sump 22 and heat the waste 20 and surrounding atmosphere (including the valve box 30) to high temperatures. The shutoff valve 42 then closes when the air supply via line 40 is cut off.

FIG. 2 illustrates a passive containment isolation system 50 having a passive isolation valve 34 for closing the sump discharge pipe 16 in the event that large amounts of released steam and water from the reactor coolant system flood the sump 22 and heat the surrounding atmosphere (including the valve box 30) to high temperatures. The pipe 16 is less than about 6 inches, and generally is less than about 2 inches in diameter, so that a pilot assembly such as is shown in FIG. 1 is not necessary. An actuator 52 responsive to the atmospheric temperature of the valve box 30 is operatively connected with the isolation valve 34 for closing the discharge pipe 16 in the event of high temperature. Although the actuator 52 may have a diaphragm 44 as is shown in FIG. 1, FIG. 3 shows another passive actuator.

FIG. 3 shows an open passive isolation valve 34 operatively connected with an actuator 52 having a shape memory effect actuating element 53 below its transformation temperature. Fluid flow through the open valve is generally indicated by flow line 51. Preferably, the shape memory effect element 53 is a nickel-titanium alloy, but it may be alternatively be fabricated of other alloys such as copper-zinc-aluminum compositions depending upon the desired transition temperature. Nickel-titanium compositions are preferred in part because of their corrosion resistance. In addition, the shape memory effect element 53 preferably displays a "one way" effect rather than a "two way" effect so that the valve 34 must be manually reset before corrective action may be undertaken and the plant restored to operating condition. Shape memory effect alloys undergo a crystalline phase change known as thermoelastic martensitic transformation. Below the transformation temperature these alloys are martensitic and can be rather easily deformed. When heated above the transformation temperature a previously deformed material is restored to an original shape and the material is converted to its high strength, austenitic condition. The transformation will occur rapidly at the transformation temperature, which depends almost entirely upon the composition of the alloy, and will develop considerable stress. The element 53 shown in FIG. 3 has a hollow cylindrical shape which increases its surface area to mass for providing a rapid thermal response to a temperature change. Alternatively, the element 53 may be a solid length or a coiled tension spring or other suitable shape. Nickel-titanium alloys are commercially available in various shapes from the Raychem Corporation.

The isolation valve 34 is preferably a globe valve as shown in FIG. 3, although other types of valves may be alternatively employed. The valve 34 has a valve stem 54 which raises to open a valve element 55 and lowers to close the valve element 55 against a valve seat 57. The actuator 52 has a housing 58 which is supported on the valve 34 by a yoke 56. An insulator 60 may be employed to thermally isolate the actuator 52 from the valve 34. A bushing 62 may be screwed into the housing 58 to guide the valve stem 54.

The valve stem 54 of FIG. 3 has a collar 64 against which the upper end of a helical compression spring 66 bears. The lower end of the compression spring 66 engages the housing 58 to bias the valve stem 54 upward in the open position.

The shape memory effect element 53 is mounted in the housing 58 alongside the valve stem 54. This element 53 is pivotally connected at its lower end via a clevis 55 welded thereto in a lower opening 72 in the housing 58 by a pivot pin 74 connected to the housing 58. The upper end of the element 53 is pivotally connected via a clevis 57 welded thereto by a pin 76 connected to a lever arm 78. The lever arm 78 is pivotally connected at one end to the housing 58 by a pivot pin 80. A shape memory effect helical spring or other shaped element (not shown) would similarly be connected with pivot pins 74 and 76. The free end of the lever arm is bifurcated to form a pair of legs 82 which straddle the valve stem 54. The shape memory effect element 53 as shown in FIG. 3 has a first relatively long length (which was previously deformed from a shorter original length) when the ambient temperature is below the transformation temperature of the alloy. When the ambient temperature rises to the transformation temperature, the length of the element 53 rapidly changes to a second shorter length which urges the lever arm 78 to rotate counterclockwise about pivot pin 80. As is shown in FIG. 4, this rotation causes feet 84 on the free end of the lever arm 78 to engage collar 64 and push downwardly in opposition to the biasing spring 66 to close the valve 34.

The housing has an upper opening 86 and side openings 88 in addition to the lower opening 72 so that the air in the valve box 30 may flow through the housing 52 and over the shape memory affect element 53 so that the element 53 can respond to ambient temperature conditions. Alternatively, the shape memory effect element may sense the ambient conditions of other fluids than air if a more elaborate arrangement than a valve box 30 is employed. In addition, the housing 58 may be positioned adjacent the wall of the sump 22 with the housing and/or element 53 coupled thereto by a thermal coupling fluid if desired.

Under normal operating conditions, the valve 34 of FIG. 3 remains open so long as the temperature surrounding the sump 22 is about 90° C. or less. It is noted that the temperature of the aqueous waste fluid may be up to about 90° C. or more without affecting the operation of the actuator 53 because the heat losses from the valve stem 54 and the actuator housing 58 to the surrounding atmosphere is substantially greater than the heat transfer through the pivot pins 74 and 76. In the event of the occurrence of a loss of cooling accident, very large amounts of high temperature steam and water will flood the sump 22 and cause the temperature of the surrounding atmosphere, including the sump walls, to rise to 100° C. or more. If the transition temperature of the nickel-titanium alloy (which may be a ternary alloy) comprising the actuator element 53 is 100° C., the actuating element 53 will return to its original shorter shape and the valve element 55 will close on its valve seat 57.

Advantageously, the valve 34 and actuator 52 of FIG. 3 is highly reliable and need only be periodically checked for leaking.

While a present preferred embodiment of the present invention has been shown and described, it is to be understood that the invention may be otherwise variously embodied within the scope of the following claims of invention.

We claim:

1. A nuclear reactor plant, comprising:

a containment vessel having an atmosphere at a temperature;

a fluid pipe extending through the containment vessel;

a passive containment isolation system, including;

an isolation valve disposed in the fluid pipe; and an actuator having a shape memory effect actuating element responsive to atmospheric temperature within the containment vessel and operatively connected with the isolation valve for closing the fluid pipe in response to the atmospheric temperature.

2. The nuclear reactor plant of claim 1, wherein the isolation valve is disposed in a sump discharge pipe.

3. The nuclear reactor plant of claim 1, wherein the isolation valve is disposed in an air duct.

4. The nuclear reactor plant of claim 1, wherein the isolation valve is disposed adjacent a containment sump.

5. The nuclear reactor plant of claim 1, wherein the actuator responsive to the atmospheric temperature comprises a thermally responsive actuation element of a pilot valve.

6. The nuclear reactor plant of claim 1, wherein the actuator responsive to atmospheric temperature is disposed in a valve box.

7. The nuclear reactor plant of claim 6, wherein the valve box is covered.

8. The nuclear reactor plant of claim 6, wherein the actuator operatively closes the isolation valve at an atmospheric temperature of at least about 100° C.

9. The nuclear reactor plant of claim 6, wherein the valve box is disposed adjacent a containment sump.

* * * * *